Nov. 8, 1932.  A. POUCHAIN  1,887,167
ELECTRIC ACCUMULATOR
Filed Dec. 17, 1927
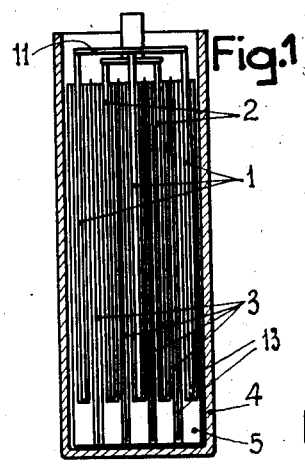
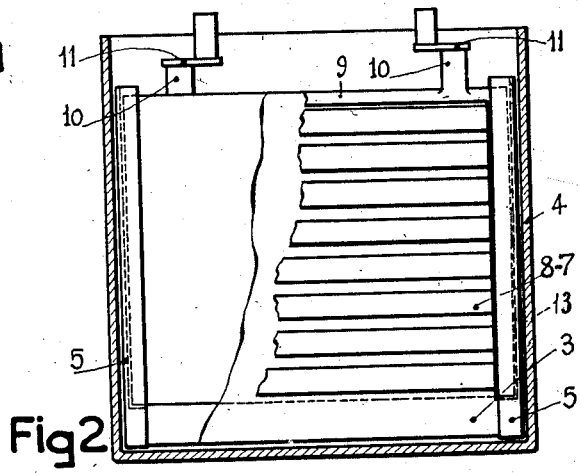
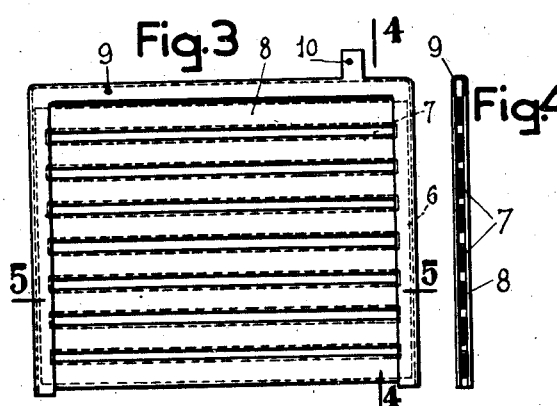
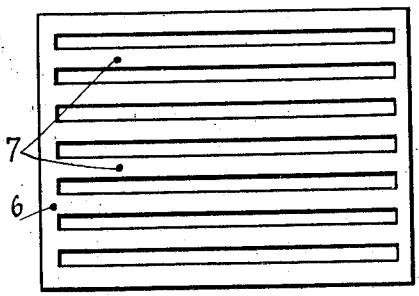
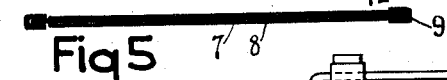
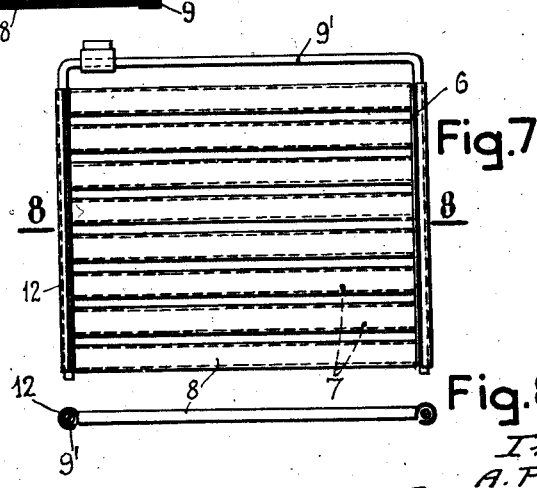
Inventor:
A. Pouchain Patented Nov. 8, 1932

1,887,167

UNITED STATES PATENT OFFICE

ADOLFO POUCHAIN, OF TURIN, ITALY

ELECTRIC ACCUMULATOR

Application filed December 17, 1927, Serial No. 240,809, and in Germany December 20, 1926.

This invention relates to electric accumulators of the type including an electrode carrying a zinc deposit and more particularly to negative electrodes for such accumulators, and has for its object a negative electrode in which the support for zinc comprises a metal member providing parallel slots, said electrode thus comprising independent sections whose ends are connected with each other by the edge portions of said member. Said edge portions have such a cross section as to provide a minimum resistance to ensure an even distribution of current, and such a result can be secured by imparting a sufficient width or thickness to said member, or, preferably, by engaging its edge portions with a conducting frame, connected with the outer circuit.

On the annexed drawing are shown embodiments of the present invention and

Figure 1 is a front view of a complete battery the front wall of the cell being removed;

Figure 2 is a longitudinal view of the inside of the same;

Figure 3 shows separately a negative electrode in accordance with this invention;

Figure 4 is a section on line 4—4 of Figure 3;

Figure 5 is a section on line 5—5 of Figure 3;

Figure 6 shows separately the zinc-supporting member of negative electrode;

Figure 7 is a view similar to Figure 3 and shows a further embodiment of the present invention;

Figure 8 is a section on line 8—8 of Fig. 7.

The accumulator shown in Figures 1 and 2 includes three negative electrodes 1 and two positive electrodes 2, the last named ones being provided by a lead plate of any suitable or preferred construction carrying lead oxide as active material.

The said set of electrodes is located, with separators 3 intermediate said plates, in a cell 4 enclosing the electrolyte which consists of a solution of zinc sulphate, with or without added substances, in diluted sulphuric acid.

The negative electrodes 1, positive electrodes 2 and separators 3 are engaged by their side edges in grooves 13 of insulating headers 5 located adjacent opposite walls of cell 4.

In the construction illustrated in Figs. 1–6 each negative electrode consists of a thin plate 6 of metal, (Figure 6), as of brass and preferably of silvered brass, which is cut out to provide parallel bands or stripes 7 each of which is coated with a zinc layer 8 consisting of a zinc sheet suitably bent and shaped. The parts 8 provide in their whole the active surface of the negative electrode.

The electrode comprising plate 6 and zinc-coatings 8 is engaged by its edges in a metal frame 9 comprising three bars, the arrangement being such as stripes 8 are caused to lie in horizontal position when the electrode is in position in the accumulator.

For this purpose frame 9 has internal grooves at least in its side bars said bars having an U-section as shown in Figures 4 and 5, and the top bar is provided with a tail 10 on which is engaged the bridge 11 to which the main or conductor leading to outer circuit is connected.

The engagement of plate 6 with a frame intended to be connected with outer circuit may also be embodied in other manners, say in the manner shown in Figures 7 and 8, in which a frame is used, which is provided by a wire 9' bent to reverse U-shape and having its two side portions or legs engaged in seats provided on the edges of plate 6 by a channel or hook-shaped portion 12 of said edges.

In both constructions each negative electrode consists of a plurality of separate sections which operate independently of each other and which are inserted in parallel in the circuit, the side portions of frame 9 or 9' providing such a cross-sectional area for the passage of current as a correct distribution of current over all said sections in parallel is always secured.

The described negative electrode is easy to manufacture and it permits of reducing to a minimum the thickness of the electrodes and improves the mounting and dismantling operations and also repairs and other manipulations of the battery.

What I claim as my invention and desire to secure by United States Letters Patent is:—

1. A negative electrode for electric accumulators, comprising a thin metal plate, a separate conducting frame having only three sides, said frame having two sides engaged an conductively connected with two opposite edges of said plate and a third side substantially entirely spaced apart from an intermediate edge of said plate, and means on said third side of said frame for connecting said electrode with an external circuit.

2. A negative electrode for the zinc electric accumulators, comprising a thin metal support of metal of higher electrical conductivity than zinc, a separate conducting frame having two sides engaged and conductively connected with two opposite edges of said support and a third side spaced apart from an intermediate edge of said support, means on said third side of said frame for connecting said electrode with an external circuit, and a deposit of zinc on the exposed portion of said support.

3. A negative electrode for electric accumulators, comprising a thin metal plate divided by slots into a number of parallel sections, a separate conducting frame having two sides engaged and conductively connected with the two edges of said plate where said parallel sections are interconnected together and a third side spaced apart from an intermediate edge of said plate, and means on said third side of said frame for connecting said electrode with an external circuit.

4. A negative electrode for electric accumulators, comprising a thin metal plate divided by slots into a number of parallel sections, a separate conducting frame formed of a metal wire having two sides engaged and conductively connected with the two edges of said plate where said parallel sections are interconnected and a third side spaced apart from an intermediate edge of said plate, and means on said third side of said frame for connecting said electrode with an external circuit.

In testimony whereof I have signed my name to this specification.

ADOLFO POUCHAIN.